United States Patent
Fukui

(10) Patent No.: US 6,179,009 B1
(45) Date of Patent: Jan. 30, 2001

(54) HEAT-INSULATING AND NOISE REDUCING DUCT

(75) Inventor: Kouki Fukui, Osaka (JP)

(73) Assignee: Totaku Industries, Inc., Osaka (JP)

( * ) Notice: Under 35 U.S.C. 154(b), the term of this patent shall be extended for 0 days.

(21) Appl. No.: 09/396,886

(22) Filed: Sep. 16, 1999

(30) Foreign Application Priority Data

Sep. 16, 1998 (JP) ................................. 10-261816

(51) Int. Cl.$^7$ ................................. F16L 11/10
(52) U.S. Cl. .................. 138/149; 138/132; 138/129; 138/137; 138/144
(58) Field of Search ................... 138/129, 149, 138/132–134, 140–144, 154, 137

(56) References Cited

U.S. PATENT DOCUMENTS

| | | | | |
|---|---|---|---|---|
| 3,548,884 | * | 12/1970 | Ambrose | 138/129 X |
| 3,916,953 | * | 11/1975 | Nagayoshi et al. | 138/132 X |
| 4,620,569 | * | 11/1986 | Von Glanstatten et al. | 138/132 |
| 5,795,634 | * | 8/1998 | Fukui | 138/149 X |
| 5,806,567 | * | 9/1998 | Fukui et al. | 138/149 X |

FOREIGN PATENT DOCUMENTS 9-89357  4/1997  (JP).

* cited by examiner

*Primary Examiner*—Patrick Brinson
(74) *Attorney, Agent, or Firm*—McGinn & Gibb, PLLC

(57) ABSTRACT

There is provided a heat-insulating and noise reducing duct constituted by reinforcing core 1, a thick felt layer 2, a foamed resin strip layer 3 and a resin-coating layer 4. The reinforcing core 1 is made of hard polyolefin resin material and wound spirally at predetermined intervals. The thick felt layer 2 is wound spirally on an outer circumferential surface of the reinforcing core so that adjacent side edge portions of the felt layer 2 are lapped over or brought into contact with each other, while the shape of the felt layer is retained by the reinforcing core 1. The foamed resin strip layer 3 made of polyolefin resin material and wound spirally on an outer circumferential surface of the felt layer 2 so that adjacent side edge portions of the foamed resin strip layer 3 are in abutment against or in tight contact with each other. The resin-coating layer 4 provided to cover an outer circumferential surface of the foamed resin strip layer 3. Accordingly, it is possible to provide a sound-absorbing and heat-insulating duct which is simple, not complicated, in structure, which can achieve both sound-absorbing and heat-insulating functions, which is suitable for use as an air-blow duct, and which is suitable for continuous production so that the duct can be mass-produced inexpensively without requiring any new equipment.

7 Claims, 2 Drawing Sheets

HEAT-INSULATING AND NOISE REDUCING DUCT

BACKGROUND OF THE INVENTION

The present invention relates to a gas transfer duct, and particularly to a gas transfer duct having a heat-insulating effect and a noise reducing effect suitable for transferring air-conditioning air which is set to have temperature different from room temperature.

A conventional transfer ducts of such a type generally have a structure in which heat-insulating foamed material is spirally wound around an outer circumferential portion of a duct body with no space, and the duct body forms an inner circumferential surface of the duct.

In such a manner, in a conventional duct having a structure in which a duct body forms an inner circumferential surface of the duct, the duct becomes a guide cylinder through which noise generated from an air-blow source such as an air blower is guided to an opening portion of the duct while gas is transferred. The noise is discharged together with the gas so as to give people an unpleasant feeling. There has been a problem that such noise jars on people's nerves because it is generated continuously while the duct is in use, that is, in air-blowing operation.

In order to largely reduce such an unpleasant noise discharged from an opening of a duct to solve the above-mentioned problem belonging to air-blow ducts of a conventional type though it may be impossible to entirely extinguish such an unpleasant noise, there has been developed and proposed one means (see Japanese patent unexamined publication No. Hei. 9-89357) which has such a structure as follows. That is, woven cloth of predetermined width is wound spirally, and then, the connection edges of the cloth are bonded to each other with hard resin strip material, so that an internal surface layer of a duct is formed. A foam strip of open cells is spirally wound on the outer circumferential surface of the woven cloth while adjacent side edges of the foam strip are brought into contact with each other, so that an open-cell foam is formed. A thin film sheet-like strip is spirally wound on the outer circumferential surface of the open-cell foam so as to form an intermediate sheet layer. A foam strip of closed cells is spirally wound on the outer circumferential surface of the intermediate sheet layer so as to form a closed-cell foam. A resin tape is spirally wound on the outermost circumference of the closed-cell foam so as to form an external surface layer which wraps the outermost circumference.

This air-blow duct is a product having a superior effect to be able to show substantially practically perfect effects of noise reducing and heat insulating functions as expected. The duct is therefore an ideal and suitable product for use as an air-blow duct. This product has, however, only one problem that the manufacturing process is complicated and expensive.

SUMMARY OF THE INVENTION

It is an object of the invention to provide a sound-absorbing and heat-insulating duct which is simple, not complicated, in structure if the constituent materials are selected, which can achieve both sound-absorbing and heat-insulating functions in spite of its simple structure, which is suitable for use as an air-blow duct, and which is suitable for continuous production so that the duct can be mass-produced inexpensively without requiring any new equipment.

The above object can be attained by a heat-insulating and noise reducing duct, according to the present invention, comprising a reinforcing core, a thick felt layer, a form strip layer and a resin-coating layer. The reinforcing core is made of hard polyolefin resin material and wound spirally at predetermined intervals. The thick felt layer is wound spirally so that adjacent side edge portions of the felt layer are lapped over or brought into contact with each other, while the shape of the felt layer is retained by the reinforcing core. The foam strip layer is made of polyolefin resin material and wound spirally on an outer circumferential surface of the felt layer so that adjacent side edge portions of the foam strip layer are in abutment against or in tight contact with each other. The resin-coating layer provided to cover an outer circumferential surface of the foam strip layer.

In order to carrying out the present invention, it is preferable that the reinforcing core is constituted by a wire having a semicircular shape in section, and a linear surface of the reinforcing core is disposed to face the inner surface of the duct.

Further, in the above-mentioned construction, it is advantageous that the resin-coating layer is formed by winding a tape made of polyolefin resin or polyvinyl chloride resin spirally.

Furthermore, in the above-mentioned construction, it is also advantageous that a the felt material constituting the felt layer is formed of needle felt made of polyolefin resin.

Moreover, in the above-mentioned construction, it is also advantageous that the back surface of the felt material is smoothed by fluffing treatment by flame and the felt material is provided so that the smooth-treated surface of the felt material is positioned on the inner surface side of the duct.

DETAILED DESCRIPTION OF THE PREFERRED EMBODMENTS

Figure 1:
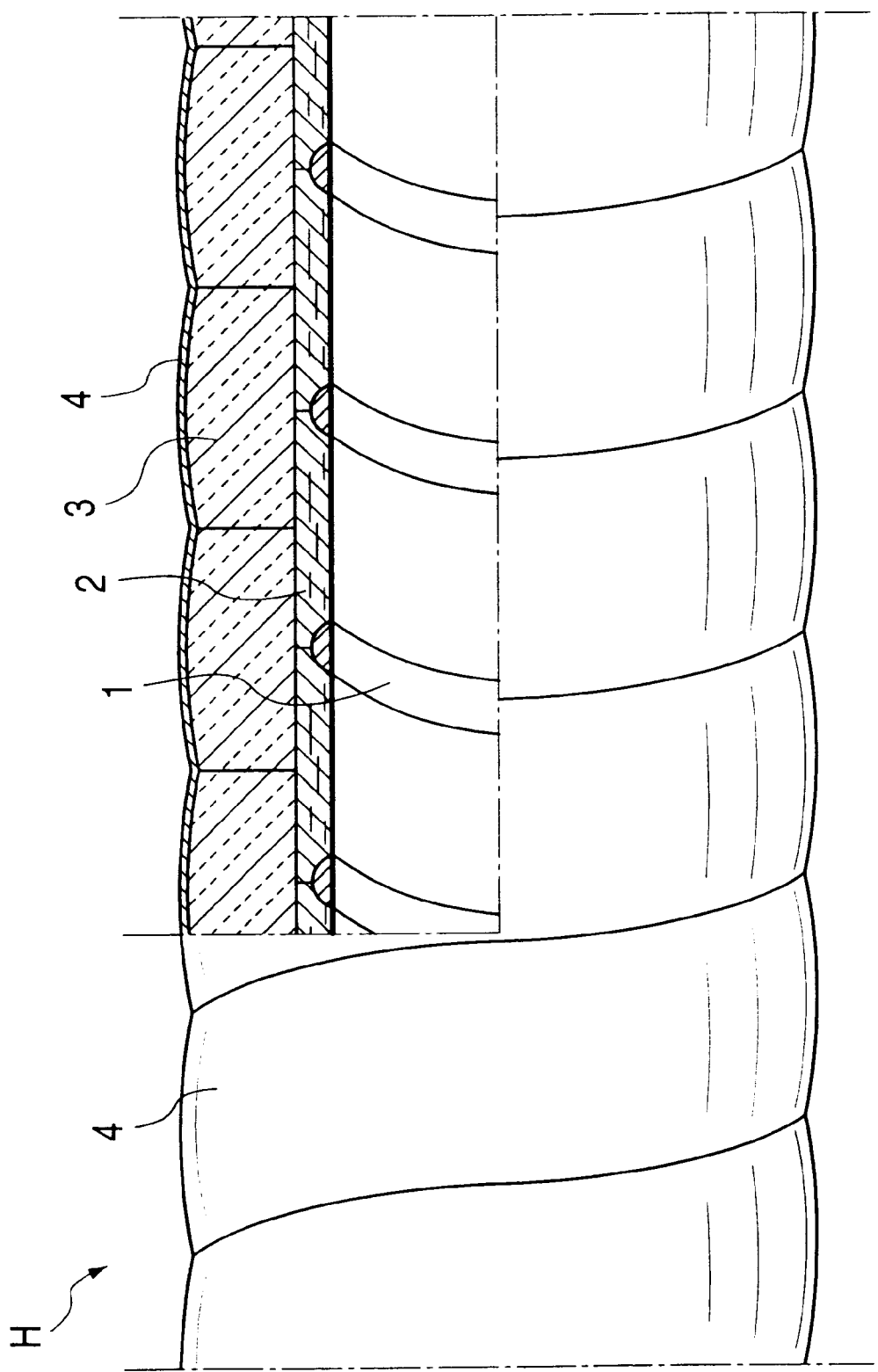
FIG. 1 shows a partially cutaway front view showing a duct of a first embodiment.

Embodiments of the present invention will be described below with reference to the drawings. FIG. 1 is a view showing a first embodiment of the present invention, in which a portion is cut away in the axial direction in order to make the sectional shape of a duct wall portion clear.

A duct hose H shown in the embodiment is a duct having a cylindrical section and having a structure as follows. For example, a long-size wire 1 of hard polypropylene (PP) resin having a semicircular shape in section is wound spirally at predetermined intervals in the innermost circumferential surface of the duct hose H so that the linear surface of the wire 1 is made inside. A thick felt strip made of chemical fiber subjected to mothproof and mildewproof finish is spirally wound on the surface of this wire 1 so as to form a felt layer 2. A foam strip of closed cells made of polypropylene resin is spirally wound on the outer circumferential surface of the felt layer 2 while not only the foam strip is brought into tight contact with the felt layer 2 but also adjacent side edge portions of the foam strip are brought into close contact to each other, so that a foamed resin strip layer 3 is formed. The outer circumferential surface of this foamed resin strip layer 3 is coated with a thin tube-like coating layer 4 made of soft polyethylene.

As the felt material for forming the felt layer 2, there was used that which was produced from polypropylene fiber superior in heat resistance and which was 3.0 mm thick is not-compressed condition and 380 g in weight per 1 m². As the closed-cell foam strip made of PP for forming the foamed resin layer 3, there used that which had a density of about 25 kg/m³ and a tensile strength of 1.7 kg/cm². Foam material of open cells may be also used as the material for forming the foamed resin strip layer 3 stated here.

More specifically, description will be made, for example, about a duct in which the effective inner diameter of the duct hose H is 100 mm, and the spiral pitch is 39 mm. A reinforcing wire made of hard PP resin and having a semicircular shape in section which is 5 mm wide and 3.0 mm high is wound spirally at intervals of 39 mm around the outer circumference of a duct forming mandrel having a diameter of 100 mm, while the linear surface of the reinforcing wire is brought into contact with the mandrel surface. At this time, the reinforcing wire is half melted immediately after it has been extruded from an extruder. The above-mentioned felt strip is wound on the outer circumferential surface of the reinforcing wire so that the felt strip is located between adjacent cores 1 and 1. While the adjacent side surfaces of the felt strip are brought into contact with each other, the lower surfaces of the opposite side portions are led in contact to the upper surface of the core 1 and welded therewith. In such a manner, the felt strip is wound spirally so as to form a felt layer 2. The above-mentioned closed-cell resin strip made of PP and made 39 mm wide and 10 mm thick is wound spirally on the outer circumferential surface of this felt layer 2 while the adjacent side edges of the closed-cell resin strip are brought into abutment against each other, so that a foamed resin strip layer 3 is formed. Further, an extruded tube made of soft PE resin and made 0.3 mm thick is put over the outer circumferential surface of this foamed resin strip layer 3 and the extruded tube is naturally shrunk so that a coating layer 4 is formed. The duct can be produced thusly.

Figure 2:
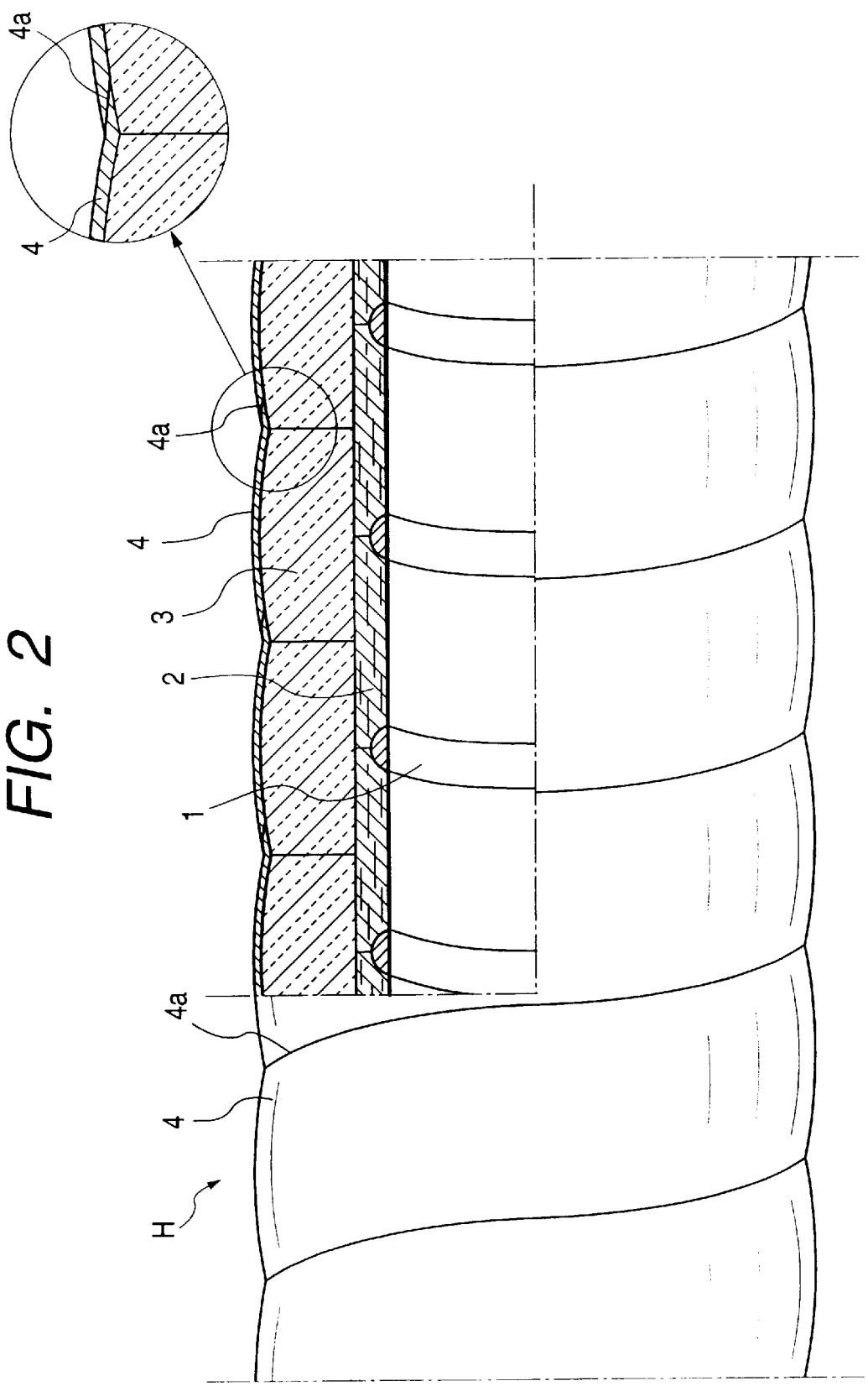
FIG. 2 shows a partially cutaway front view showing a duct of a second embodiment.

FIG. 2 shows a second embodiment, in which the coating layer 4 which is the outermost layer is different from that in the above-mentioned first embodiment. The coating layer 4 shown in this embodiment is formed by spirally winding a tape made of soft PVC, which is, for example, 43 mm wide and 0.5 mm thick, while the adjacent side edge portions of the tape are lapped over each other by a width of about 4 mm. Then, the lapped portions 4a are welded integrally or bonded to each other by bonding agent so as to form the coating layer 4. The coating layer 4 may be formed by use of tape-like material in such a manner.

Although description was made about embodiments regarded as representatives of the present invention, the present invention is not always limited only to those ducts which were described in the structures of these embodiments. For example, the present invention may be carried out as a duct in which a core 1 is disposed on the surface side of a felt layer 2. The present invention may be carried out as appropriate modifications within a scope in which the above-mentioned constituent prerequisites of the present invention are provided, the object thereof is attained, and the following effects are generated.

The present invention is based on Japanese Patent Application No. Hei. 10-261816, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As is apparent from the above-mentioned description, in a heat-insulating and noise reducing duct according the present invention, felt is adopted as material for forming an internal wall of the duct. Therefore, the felt itself forms a continuous internal wall while it receives a force to retain its shape from a reinforcing core. Accordingly this felt material itself for forming the internal wall effectively absorbs sound generated from an air-blow source such as an air blower or the like, or noise generated with the transfer of gas. At the same time, the felt itself has a heat-insulating effect in cooperation with a foamed layer formed on the outer circumferential surface of the felt, so that it is also possible to provide an effect of preventing a change in temperature of gas passing through the duct. Accordingly, there is a conspicuous effect that it is possible to effectively control the sound-absorbing effect and the heat-insulating effect to a maximum though two layers of the felt layer and the foamed layer substantially working as heat-insulating and noise reducing layers. In addition, since the number of layers is small and no portion needs much time to produce, there is another effect that the duct can be continuously produced easily and efficiently.

What is claimed is:

1. A heat insulating and noise reducing duct comprising:

a reinforcing core (1) made of hard polyolefin resin material and wound spirally at predetermined intervals;

a felt layer (2) wound spirally so that adjacent side edge portions of said felt layer (2) are lapped over or brought into contact with each other, while the shape of said felt layer is retained by said reinforcing core (1);

a foam strip layer (3) made of polyolefin resin material and wound spirally on an outer circumferential surface of said felt layer (2) so that adjacent side edge portions of said foam strip layer (3) are in abutment against or in tight contact with each other; and a resin-coating layer (4) provided to cover an outer circumferential surface of said foam strip layer (3).

2. A heat insulating and noise reducing duct according to claim 1, wherein said reinforcing core (1) is a wire having a semicircular shape in section, and a linear surface of said reinforcing core (1) is disposed to face the inner surface of said duct.

3. A heat-insulating and noise reducing duct according to claim 1, wherein said resin-coating layer (4) is formed by winding a tape made of polyolefin resin or polyvinyl chloride resin spirally.

4. A heat-insulating and noise reducing duct according to claim 2, wherein said resin-coating layer (4) is formed by winding a tape made of polyolefin resin or polyvinyl chloride resin spirally.

5. A heat-insulating and noise reducing duct according to claim 1, wherein said felt layer (2) is formed of needle felt made of polyolefin resin.

6. A heat-insulating and noise reducing duct according to claim 5, wherein a smooth-finished surface of felt material forming said felt layer (2) is disposed on the inner surface side of said duct.

7. A heat-insulating and noise reducing duct according to claim 1, wherein said resin-coating layer (4) is formed from an extruded tube made of soft PE resin.

* * * * *